(12) United States Patent
Pang (10) Patent No.: US 11,874,825 B2
(45) Date of Patent: Jan. 16, 2024

(54) HANDLING OF AN INDEX UPDATE OF TIME SERIES DATA

(71) Applicant: VMware LLC, Palo Alto, CA (US)

(72) Inventor: Clement Pang, Sunnyvale, CA (US)

(73) Assignee: VMware LLC, Palo Alto, CA (US)

( * ) Notice: Subject to any disclaimer, the term of this patent is extended or adjusted under 35 U.S.C. 154(b) by 498 days.

(21) Appl. No.: 16/111,587

(22) Filed: Aug. 24, 2018

(65) Prior Publication Data

US 2020/0065411 A1 Feb. 27, 2020

(51) Int. Cl.
  *G06F 16/23* (2019.01)
  *G06F 16/22* (2019.01)
  *G06F 16/2458* (2019.01)

(52) U.S. Cl.
  CPC ...... *G06F 16/2379* (2019.01); *G06F 16/2272* (2019.01); *G06F 16/2477* (2019.01)

(58) Field of Classification Search
  CPC ............. G06F 16/2379; G06F 16/2477; G06F 16/2272; G06F 16/2471; G06F 16/9024
  See application file for complete search history.

(56) References Cited

U.S. PATENT DOCUMENTS

| | | | |
|---|---|---|---|
| 7,827,168 B2 * | 11/2010 | Bernard | G06F 16/2272 707/715 |
| 2005/0234945 A1 * | 10/2005 | Folkert | G06F 16/2393 |
| 2006/0036606 A1 * | 2/2006 | Hildebrand | G06F 16/27 |
| 2007/0168400 A1 * | 7/2007 | Lee | G06F 16/328 |
| 2007/0280279 A1 * | 12/2007 | Mituhasi | H04L 12/1895 370/428 |
| 2014/0172866 A1 * | 6/2014 | Lin | G06F 16/2455 707/741 |

* cited by examiner

*Primary Examiner* — Amanda L Willis
(74) *Attorney, Agent, or Firm* — Quarles & Brady LLP (57) ABSTRACT

In a computer-implemented method for handling of an index update, time series data is received at an ingestion node of a time series data monitoring system. An index update is determined based on the time series data. The index update is stored to an index database of the time series data monitoring system. The index update is forward to a plurality of query nodes of the time series data monitoring system.

16 Claims, 5 Drawing Sheets

HANDLING OF AN INDEX UPDATE OF TIME SERIES DATA

BACKGROUND

Management, monitoring, and troubleshooting in dynamic environments, both cloud-based and on-premises products, is increasingly important as the popularity of such products continues to grow. As the quantities of time-sensitive data grow, conventional techniques are increasingly deficient in the management of these applications. Conventional techniques, such as relational databases, have difficulty managing large quantities of data and have limited scalability. Moreover, as monitoring analytics of these large quantities of data often have real-time requirements, the deficiencies of reliance on relational databases become more pronounced.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DETAILED DESCRIPTION OF CERTAIN EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "determining," "storing," "forwarding," "performing," "updating," "processing," "writing," "refreshing," or the like, refer to the actions and processes of an electronic computing device or system such as: a host processor, a processor, a memory, a cloud-computing environment, a hyper-converged appliance, a software defined network (SDN) manager, a system manager, a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Example embodiments described herein improve the performance of computer systems by providing proactive handling of index updates on time series data. In various embodiments, a computer-implemented method for proactive handling of an index update is provided. Time series data is received at an ingestion node of a time series data monitoring system. An index update is determined based on the time series data. The index update is stored to an index database of the time series data monitoring system. The index update is forward to a plurality of query nodes of the time series data monitoring system.

Time series data can provide powerful insights into the performance of a system. The monitoring and analysis of time series data can provide large amounts of data for analysis. Due to volume of time series data typically received, as well as the frequency of receipt of the time series data, analysis of the data can be challenging. Embodiments described herein provide for improved querying of the data by utilizing an index at the query nodes that is representative of the current state of data points ingested into the time series data monitoring system.

As data points of time series data are ingested into the time series data monitoring system, the data points are persisted on disk (e.g., a time series database). Query nodes of the time series data monitoring system receive queries for searching the time series data. Query nodes include an index structure stored in memory for generating query plans for execution on the time series data and for execution of the query plans. The index structure of a query node can be refreshed from the index structure of the index database of the time series data monitoring system, which maintains the index structure. However, updates to the index database from newly received time series data typically suffer from time lags due to the volume of data points received. Furthermore, updates to the index structure of query nodes from the index database also typically lag due to the volume of data and the intermittent updating of the local index structure.

Embodiments described herein provide for the updating of the index structure of the query nodes concurrent to the updating of the index database, by communicating index updates from the ingestion nodes to the query nodes. The index updates are representative of changes to the indices based on the newly received time series data. The query nodes are configured to update the local versions of the index structure using the index updates, thus ensuring the local versions of the index structure are representative of the data points stored in the time series database.

As presented above, time series data monitoring systems typically process very large amounts of data, such that it can be very difficult to perform query planning on execution on a current state of the time series data. The generation of index updates at ingestion nodes, and providing the index updates to the query nodes such that the query nodes can maintain an index structure representative of a current state of the time series data speeds up query processing and improves the performance and accuracy of query processing, thereby improving the performance of the overall system. Hence, the embodiments of the present invention greatly extend beyond conventional methods of proactive index updates of a time series data monitoring system. Moreover, embodiments of the present invention amount to significantly more than merely using a computer to perform the proactive index updates. Instead, embodiments of the present invention specifically recite a novel process, rooted in computer technology, for providing query nodes with the index updates to ensure consistency and accuracy of the index structure of the query nodes to overcome a problem specifically arising in the realm of monitoring time series data and processing queries on time series data within computer systems.

Example System for Managing Time Series Data

Figure 1:
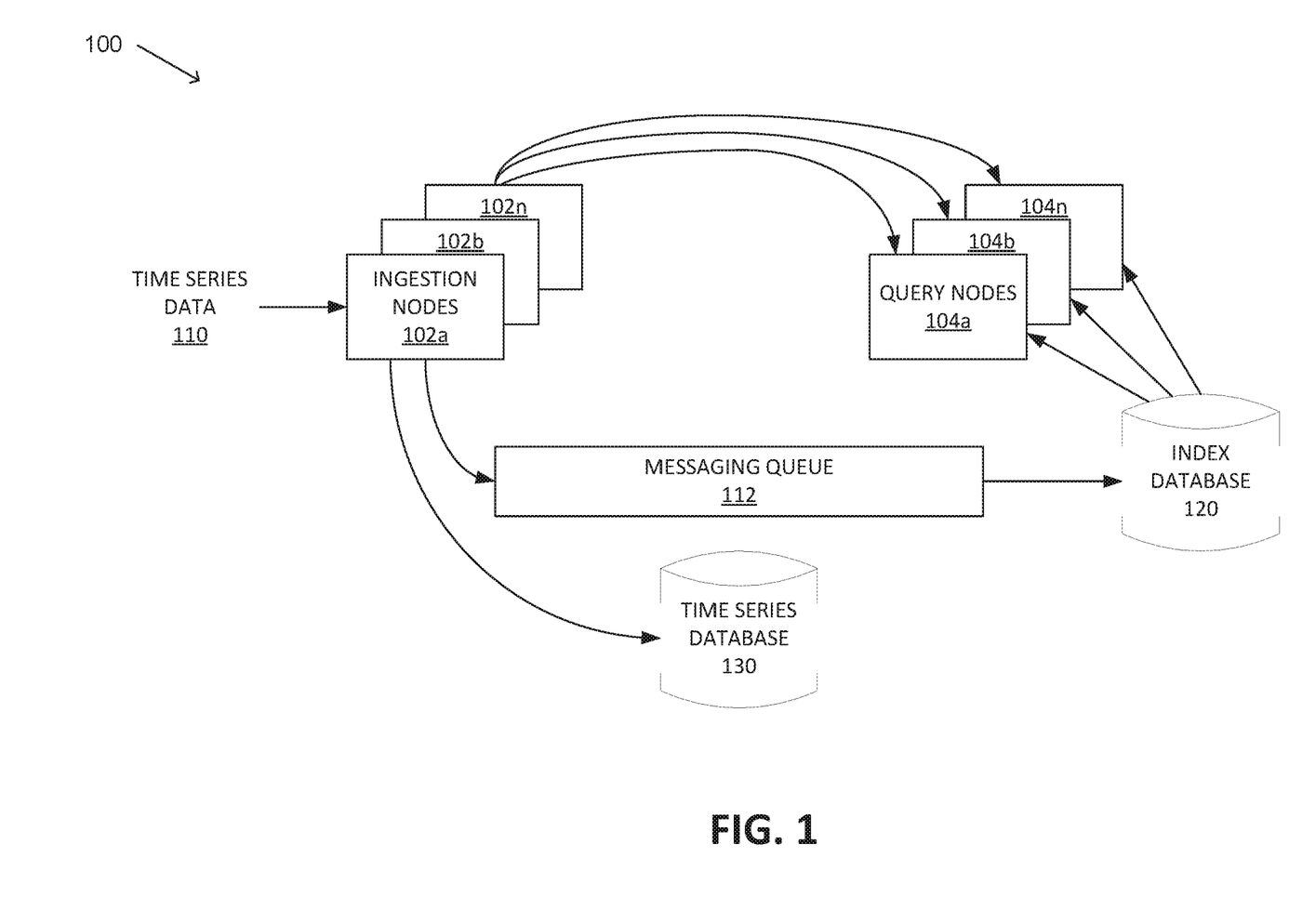
FIG. 1 is a block diagram illustrating a system for managing data including ingestion of the time series data and processing queries of the time series data, in accordance with embodiments.

FIG. 1 is a block diagram illustrating an embodiment of a system 100 for managing time series data 110 including ingestion of the time series data 110 and processing queries of time series data 110. System 100 is a distributed system including multiple ingestion nodes 102a through 102n (collectively referred to herein as ingestion nodes 102) and multiple query nodes 104a through 104n (collectively referred to herein as query nodes 104). It should be appreciated that system 100 can include any number of ingestion nodes 102 and multiple query nodes 104. Ingestion nodes 102 and query nodes 104 can be distributed over a network of computing devices in many different configurations. For example, the respective ingestion nodes 102 and query nodes 104 can be implemented where individual nodes independently operate and perform separate ingestion or query operations. In some embodiments, multiple nodes may operate on a particular computing device (e.g., via virtualization), while performing independently of other nodes on the computing device. In other embodiment, many copies of the service (e.g., ingestion or query) are distributed across multiple nodes (e.g., for purposes of reliability and scalability).

Time series data 110 is received at at least one ingestion node 102a through 102n. In some embodiments, time series data includes a numerical measurement of a system or activity that can be collected and stored as a metric (also referred to as a "stream"). For example, one type of metric is a CPU load measured over time. Other examples include, service uptime, memory usage, etc. It should be appreciated that metrics can be collected for any type of measurable performance of a system or activity. Operations can be performed on data points in a stream. In some instances, the operations can be performed in real time as data points are received. In other instances, the operations can be performed on historical data. Metrics analysis include a variety of use cases including online services (e.g., access to applications), software development, energy, Internet of Things (IoT), financial services (e.g., payment processing), healthcare, manufacturing, retail, operations management, and the like. It should be appreciated that the preceding examples are non-limiting, and that metrics analysis can be utilized in many different types of use cases and applications.

In accordance with some embodiments, a data point in a stream (e.g., in a metric) includes a name, a source, a value, and a time stamp. Optionally, a data point can include one or more tags (e.g., point tags). For example, a data point for a metric may include:

A name—the name of the metric (e.g., CPU_idle, service.uptime)

A source—the name of an application, host, container, instance, or other entity generating the metric (e.g., web_server_1, app1, app2)

A value—the value of the metric (e.g., 99% idle, 1000, 2000)

A timestamp—the timestamp of the metric (e.g., 1418436586000)

One or more point tags (optional)—custom metadata associated with the metric (e.g., location=las_vegas, environment=prod)

Ingestion nodes 102 are configured to process received data points of time series data 110 for persistence and indexing. In some embodiments, ingestion nodes 102 forward the data points of time series data 110 to time series database 130 for storage. In some embodiments, the data points of time series data 110 are transmitted to an intermediate buffer for handling the storage of the data points at time series database 130. In one embodiment, time series database 130 can store and output time series data, e.g., TS1, TS2, TS3, etc. The data can include times series data, which may be discrete or continuous. For example, the data can include live data fed to a discrete stream, e.g., for a standing query. Continuous sources can include analog output representing a value as a function of time. With respect to processing operations, continuous data may be time sensitive, e.g., reacting to a declared time at which a unit of stream processing is attempted, or a constant, e.g., a 5V signal. Discrete streams can be provided to the processing operations in timestamp order. It should be appreciated that the time series data may be queried in real-time (e.g., by accessing the live data stream) or offline processing (e.g., by accessing the stored time series data).

Ingestion nodes 102 are also configured to process the data points of time series data 110 for determining updates to the indices for locating the data points in time series database 130. During the ingestion of data points, ingestion nodes 102 detect the index updates that are needed. Index updates are communicated to messaging queue 112 which will process the index updates (e.g., sequentially) and ultimately update the indices located in index database 120. Index database 120 maintains indices of the data points of time series database 130.

Query nodes 104 are configured receive and process queries for searching the time series data. In order to plan and perform the searches, query nodes 104 utilize locally stored index structures that identify the location of the data points in time series database 130. In some embodiments, the index structures are stored in memory of each query node 104. The index structures stored in each query node 104 are typically refreshed according to a schedule (e.g., periodically or sporadically), but at a much slower rate than the rate at which data points are received and index updates are generated.

Ingestion nodes 102 are also configured to forward the index updates to query nodes 104 so that the locally stored index structure represents a current state of the received time series data. For instance, in some embodiment, an ingestion node 102 performs a multicast of the index update to query nodes 104. The query nodes 104 are configured to update the local version of the index structures according to the index update. In some embodiments, ingestion nodes 102 batch a number of index writes as an index update, which is multicast to the query nodes 104. In this way, the index structure in the memory of a query node is patched to account for the slow rate of index refresh, providing an index structure that matches the data points received and stored in the time series database.

The forwarding of index updates to query nodes 104 in addition to index database 120 (via messaging queue 112) has the effect that recently received time series data 110 would appear in query results provided by query nodes 104 even if the index updates have not yet been made durable on disk (e.g., written) within index database 120. In the described embodiments, the state of the index structure of the query nodes is synchronized according to the index updates received directly from the ingestion nodes 102.

Hence, the embodiments of the present invention greatly extend beyond conventional methods of indexing and storage of time series data. Moreover, embodiments of the present invention amount to significantly more than merely using a computer to index time series data. Instead, embodiments of the present invention specifically recite a novel process, rooted in computer technology, providing index updates directly to query nodes of a system for managing time series data, allowing the query nodes to update the local versions of the index structure to account for consistency and time delays inherent in the updating of an index database in a distributed system to overcome a problem specifically arising in the realm of managing time series data within computer systems.

Figure 2:
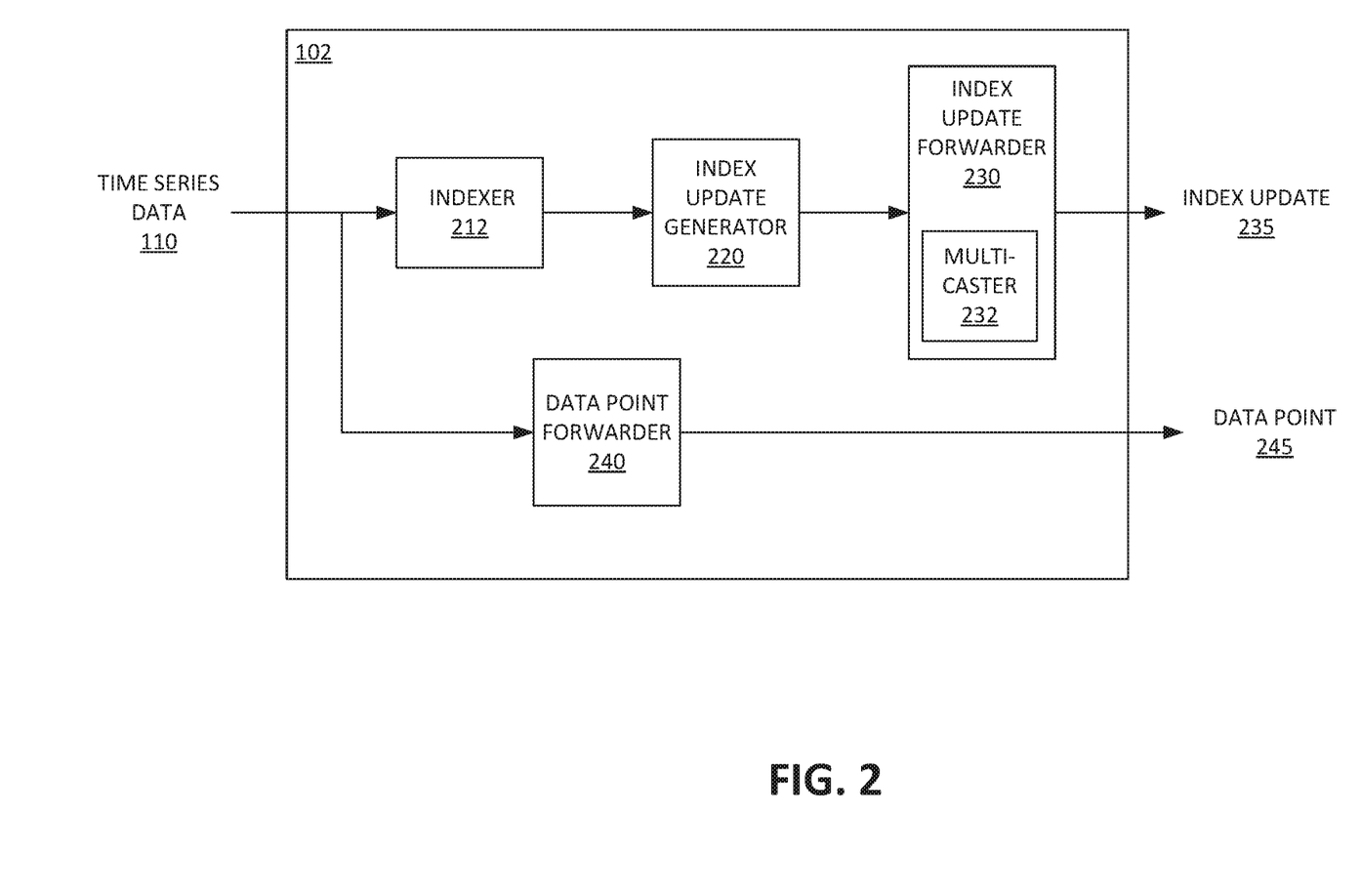
FIG. 2 is a block diagram illustrating an example ingestion node for ingesting data points of time series data, in accordance with embodiments.

FIG. 2 is a block diagram illustrating an embodiment of an example ingestion node 102 (e.g., one of ingestion nodes 102a through 102n of FIG. 1) for ingesting data points of time series data 110. In one embodiment, ingestion node 102 receives time series data 110, generates index updates for data points of time series data 110, and directs the durable storage of the data points 245 and the index updates 235. Ingestion node 102 includes indexer 212, index update generator 220, index update forwarder 230, and data point forwarder 240. It should be appreciated that ingestion node 102 is one node of a plurality of ingestion nodes of a distributed system for managing time series data (e.g., system 100).

In the example shown in FIG. 2, a time series data 110 is received. In one embodiment, the time series data 110 comprising data points is received from an application or system. The data points are processed at indexer 212 for generating indices. Time series data 110 is collected and sorted into a plurality of indices to facilitate retrieval of the source time series data 110 (e.g., which data stream to access or which data store to access). It should be appreciated that indexer 212 can generate many different types of indices for facilitating data retrieval. For example, indices can include one or more of a prefix index, a trigram index, a two-tier index, and a three-tier index. A prefix index is an index that includes prefixes of searchable terms. A trigram index is an index that includes three letter combinations of searchable terms. A two-tier index is an index that relates two searchable dimensions (e.g., metric to host or host to metric). A three-tier index is an index that relates three searchable dimensions (e.g., metric to host to point tag or host to metric to point tag).

As data points are processed by ingestion node 102, index update generator 220 receives index writes generated by indexer 212, where the index writes include changes to the indices. In one embodiment, index update generator 220 aggregates or batches index writes into an index update 235. Index update forwarder 230 is configured to communicate index update 235 to an index database (e.g., index database 120) and a plurality of query nodes (e.g., query nodes 104a through 104n of FIG. 1). In one embodiment, index update forwarder includes multicaster 232 for performing the multicasting of index update 235 to a plurality of query nodes. Data point forwarder 240 is configured to forward the data points 245 of time series data 110 to durable storage (e.g., time series database 130 of FIG. 1).

Figure 3:
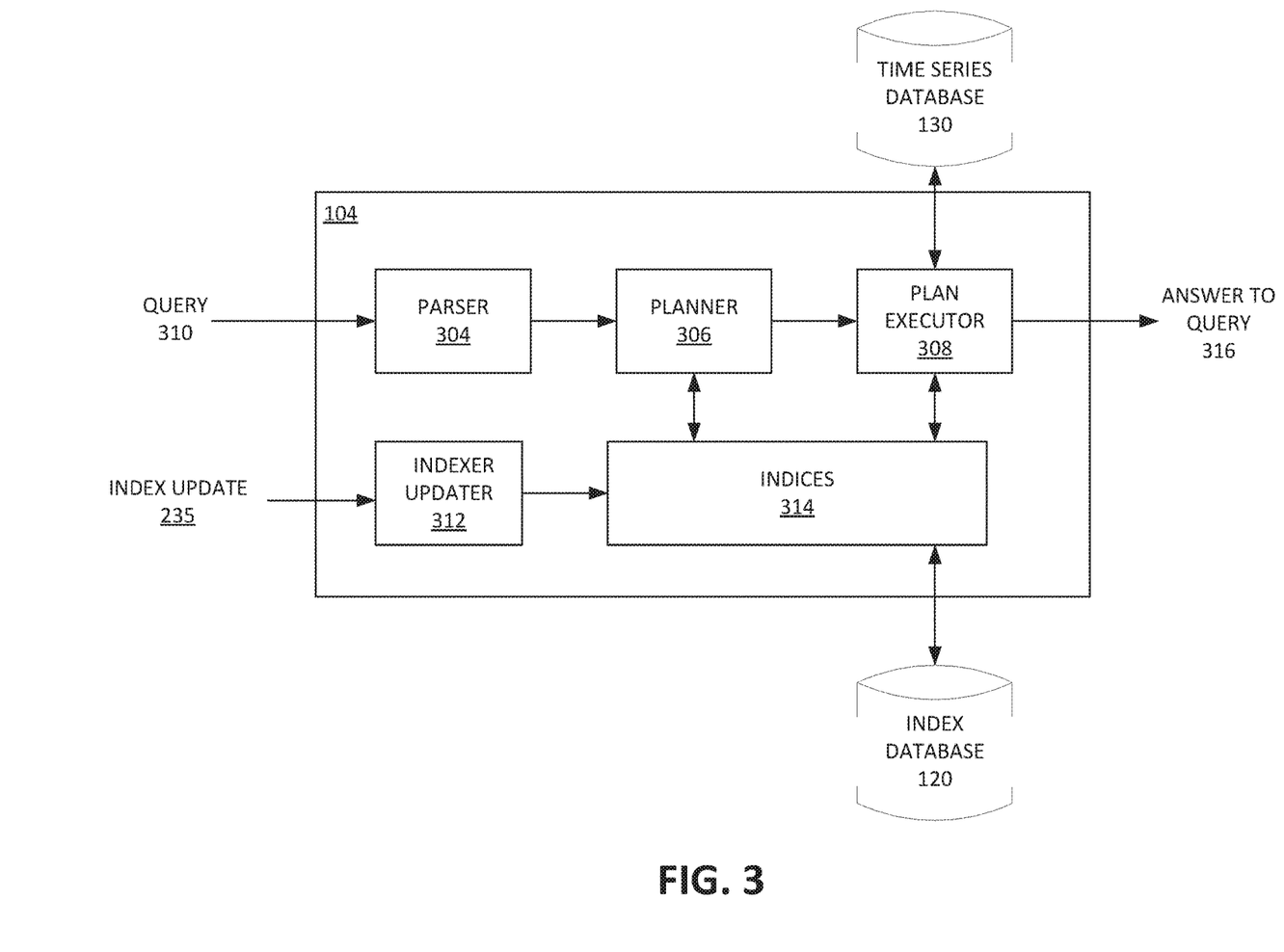
FIG. 3 is a block diagram illustrating an example query node for responding to a query regarding time series data, in accordance with embodiments.

FIG. 3 is a block diagram illustrating an embodiment of an example query node 104 (e.g., one of query nodes 104a through 104n of FIG. 1) for responding to a query 310 regarding time series data. In one embodiment, query node 104 generates a query plan for the time series data based on the query 310. Query node 104 includes parser 304, planner 306, executor 308, index updater 312, and indices 314. Query node 104 can be implemented by a query execution engine configured to parse a query at parser 304, produce a query execution plan at planner 306, fetch time series data and run the time series data through processing operations, and determine an answer or response to the query at executor 308.

Index update 235 is received at index updater 312 of query node 104. Index updater 312 is configured to update indices 314 (e.g., index structure) according to index update 235. For example, index updater 312 can patch indices 314 according to the contents of index update 235. In some embodiments, according to a schedule (e.g., periodically or sporadically), indices 314 are refreshed according to the contents of index database 120. For example, once every 24 hours, indices 314 are overwritten according to the index structure of index database 120 for the purposes of maintaining consistency. Index updates 235 are used in the intervening time to maintain a current state of indices 314.

In the example shown in FIG. 3, a query 310 is received. In one embodiment, the query 310 is provided by a user via a client. Time series data is provided by a time series database 130. Query 310 is received for searching the time series data. A query can include elements that define searchable parameters of the time series data. For example, the query can include elements defining terms related to metrics, sources, values, timestamps, and/or point tags for isolating and returning relevant results. The parser 304 receives a query 310 and parses the query for a predicate (e.g., elements and operators).

The planner 306 receives the parsed elements and operators of query 310 and generates a query plan for retrieval of relevant time series data that resolves the query 310. The planner 306 determines operations to be performed on the relevant time series data to retrieve a result of the query 310.

In operation, query node 104 receives a query. Planner 306 generates a query plan for determining what to retrieve from time series databases 130 based on the query 310. For example, planner 306 determines how many scans to make on the time series database(s). The planner 306 then hands off commands (e.g., a query plan) to executor 308 to perform an execution phase, e.g., beginning execution of the query 310. The executor 308 then outputs an answer 316 to the query. Although shown as a single stream, the answer 316 to the query can include one or more streams.

Figure 4:
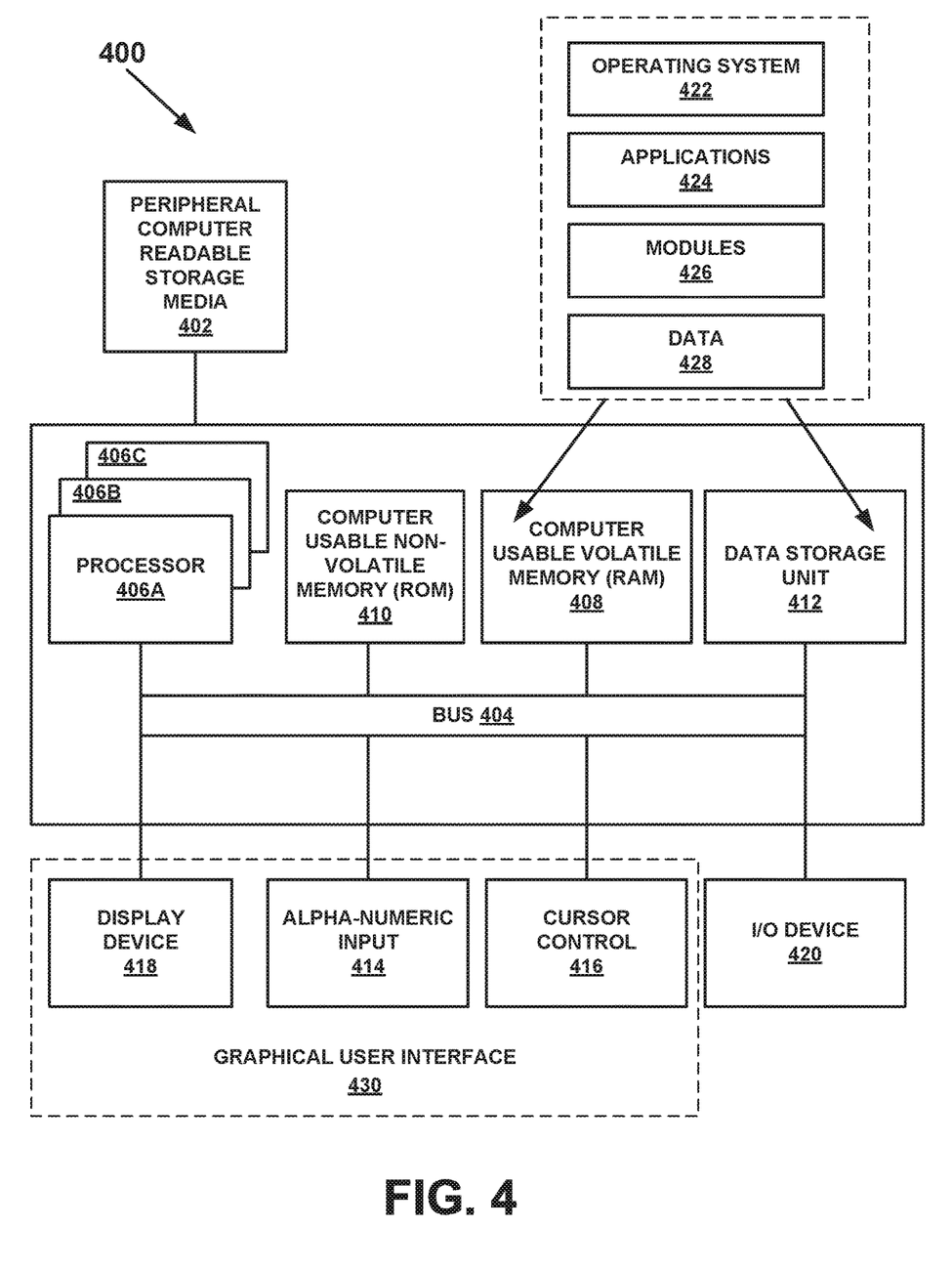
FIG. 4 is a block diagram of an example computer system upon which embodiments of the present invention can be implemented.

FIG. 4 is a block diagram of an example computer system 400 upon which embodiments of the present invention can be implemented. FIG. 4 illustrates one example of a type of computer system 400 (e.g., a computer system) that can be used in accordance with or to implement various embodiments which are discussed herein.

It is appreciated that computer system 400 of FIG. 4 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand-alone computer systems, media centers, handheld computer systems, multi-media devices, and the like. In some embodiments, computer system 400 of FIG. 4 is well adapted to having peripheral tangible computer-readable storage media 402 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 400 of FIG. 4 includes an address/data bus 404 for communicating information, and a processor 406A coupled with bus 404 for processing information and instructions. As depicted in FIG. 4, computer system 400 is also well suited to a multi-processor environment in which a plurality of processors 406A, 406B, and 406C are present. Conversely, computer system 400 is also well suited to having a single processor such as, for example, processor 406A. Processors 406A, 406B, and 406C may be any of various types of microprocessors. Computer system 400 also includes data storage features such as a computer usable volatile memory 408, e.g., random access memory (RAM), coupled with bus 404 for storing information and instructions for processors 406A, 406B, and 406C. Computer system 400 also includes computer usable non-volatile memory 410, e.g., read only memory (ROM), coupled with bus 404 for storing static information and instructions for processors 406A, 406B, and 406C. Also present in computer system 400 is a data storage unit 412 (e.g., a magnetic or optical disc and disc drive) coupled with bus 404 for storing information and instructions. Computer system 400 also includes an alphanumeric input device 414 including alphanumeric and function keys coupled with bus 404 for communicating information and command selections to processor 406A or processors 406A, 406B, and 406C. Computer system 400 also includes an cursor control device 416 coupled with bus 404 for communicating user input information and command selections to processor 406A or processors 406A, 406B, and 406C. In one embodiment, computer system 400 also includes a display device 418 coupled with bus 404 for displaying information.

Referring still to FIG. 4, display device 418 of FIG. 4 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 416 allows the computer user to dynamically signal the movement of a visible symbol (cursor) on a display screen of display device 418 and indicate user selections of selectable items displayed on display device 418. Many implementations of cursor control device 416 are known in the art including a trackball, mouse, touch pad, touch screen, joystick or special keys on alphanumeric input device 414 capable of signaling movement of a given direction or manner of displacement. Alternatively, it will be appreciated that a cursor can be directed and/or activated via input from alphanumeric input device 414 using special keys and key sequence commands. Computer system 400 is also well suited to having a cursor directed by other means such as, for example, voice commands. In various embodiments, alphanumeric input device 414, cursor control device 416, and display device 418, or any combination thereof (e.g., user interface selection devices), may collectively operate to provide a graphical user interface (GUI) 430 under the direction of a processor (e.g., processor 406A or processors 406A, 406B, and 406C). GUI 430 allows user to interact with computer system 400 through graphical representations presented on display device 418 by interacting with alphanumeric input device 414 and/or cursor control device 416.

Computer system 400 also includes an I/O device 420 for coupling computer system 400 with external entities. For example, in one embodiment, I/O device 420 is a modem for enabling wired or wireless communications between computer system 400 and an external network such as, but not limited to, the Internet. In one embodiment, I/O device 420 includes a transmitter. Computer system 400 may communicate with a network by transmitting data via I/O device 420.

Referring still to FIG. 4, various other components are depicted for computer system 400. Specifically, when present, an operating system 422, applications 424, modules 426, and data 428 are shown as typically residing in one or some combination of computer usable volatile memory 408 (e.g., RAM), computer usable non-volatile memory 410 (e.g., ROM), and data storage unit 412. In some embodiments, all or portions of various embodiments described herein are stored, for example, as an application 424 and/or module 426 in memory locations within RAM 408, computer-readable storage media within data storage unit 412, peripheral computer-readable storage media 402, and/or other tangible computer-readable storage media.

Example Methods of Operation

The following discussion sets forth in detail the operation of some example methods of operation of embodiments.

Figure 5:
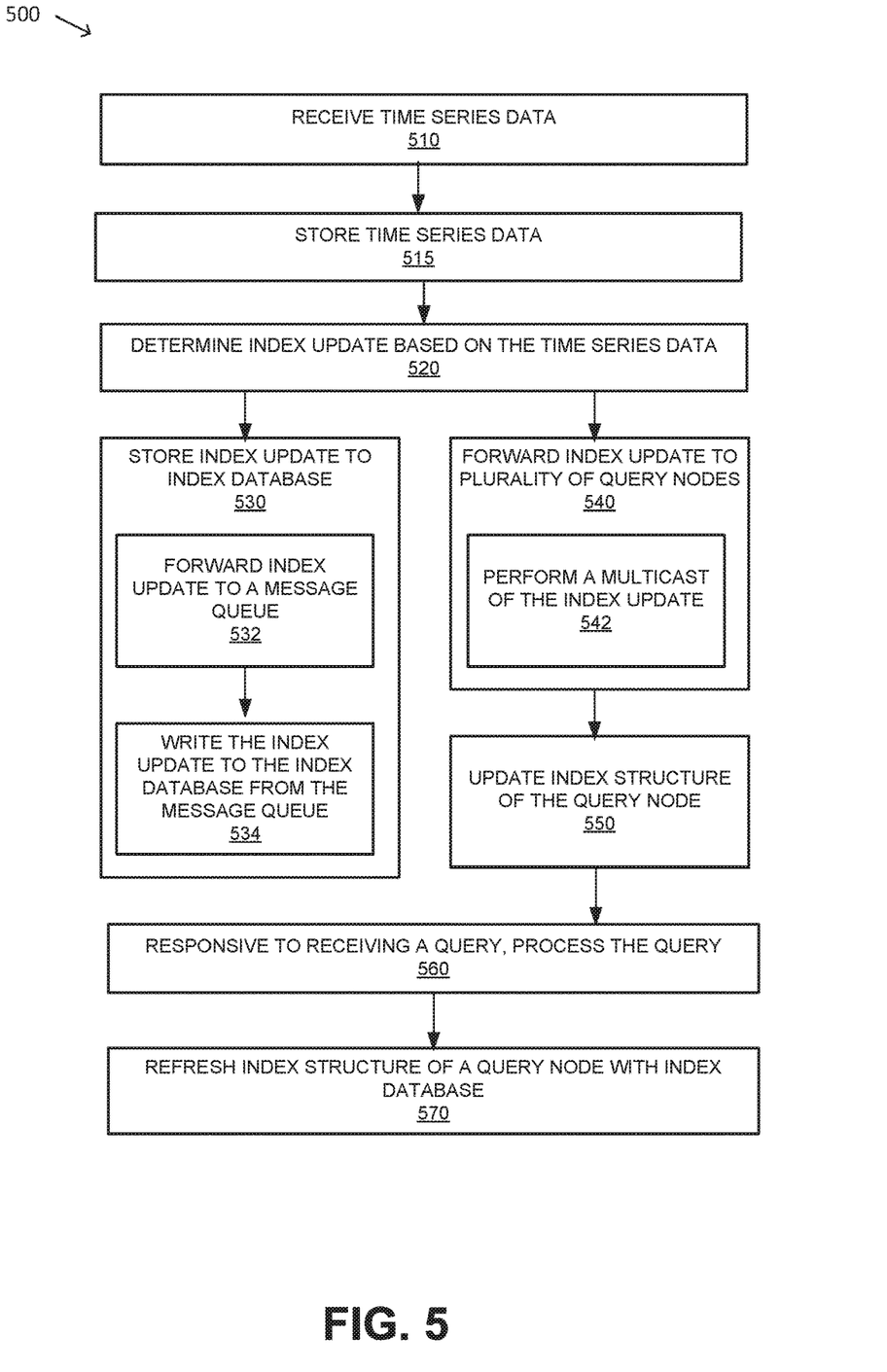
FIG. 5 depicts a flow diagram for proactive handling of an index update, according to various embodiments.

With reference to FIG. 5, flow diagram 500 illustrates example procedures used by various embodiments. The flow diagram 500 includes some procedures that, in various embodiments, are carried out by a processor under the control of computer-readable and computer-executable instructions. In this fashion, procedures described herein and in conjunction with the flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 400). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagram, such procedures are examples. That is, embodiments are well suited to performing various other procedures or variations of the procedures recited in the flow diagram. Likewise, in some embodiments, the procedures in flow diagram 500 may be performed in an order different than presented and/or not all of the procedures described in flow diagram 500 may be performed. It is further appreciated that procedures described in flow diagram 500 may be implemented in hardware, or a combination of hardware with firmware and/or software provided by computer system 400.

FIG. 5 depicts a flow diagram 500 for proactive handling of an index update, according to various embodiments. At procedure 510 of flow diagram 500, time series data is received. In one embodiment, as shown at procedure 515, the time series data is stored (e.g., at time series database 130).

At procedure 520, an index update is determined based on the time series data. At procedure 530, the index update is stored to an index database of the time series data monitoring system. In one embodiment, as shown at procedure 532, the index update is forwarded to a message queue of the time series data monitoring system. At procedure 534, the index update is written to the index database from the message queue. At procedure 540, the index update is forwarded to a plurality of query nodes of the time series data monitoring system from the ingestion node. In one embodiment, as shown at procedure 542, a multicast of the index update is performed to the plurality of query nodes. In one embodiment, procedures 530 and 540 are performed concurrently.

In one embodiment, as shown at procedure 550, responsive to receiving the index update at a query node of the plurality of query nodes, index structure of the query node is updated with the index update. In one embodiment, as shown at procedure 560, responsive to receiving a query at a query node, the query is processed according to the index structure including the index update. In one embodiment, as shown at procedure 570, the index structure of a query node is refreshed according to a refresh schedule, wherein the refreshing overwrites the index structure of the query node with the index database.

It is noted that any of the procedures, stated above, regarding the flow diagrams of FIG. 5 may be implemented in hardware, or a combination of hardware with firmware and/or software. For example, any of the procedures are implemented by a processor(s) of a cloud environment and/or a computing environment.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible, regardless the degree of virtualization. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method for handling of an index update, the method comprising:
    receiving time series data at an ingestion node of a time series data monitoring system, wherein the ingestion node is configured to process the time series data for persistence and indexing;
    storing the time series data at a time series database of the time series data monitoring system;
    determining an index update based on the time series data at the ingestion node;
    storing the index update to an index database of the time series data monitoring system;
    forwarding the index update to a plurality of query nodes of the time series data monitoring system from the ingestion node, wherein each query node of the plurality of query nodes maintains a locally stored index structure and is configured to receive and process queries for searching the time series data using the locally stored index structure;
    receiving a query at a query node of the plurality of query nodes; and
    responsive to receiving a query at the query node, utilizing the locally stored index structure of the query node to identify a location of data point responsive to the query at the time series database.

2. The computer-implemented method of claim 1, wherein the forwarding the index update to a plurality of query nodes of the time series data monitoring system comprises:
    performing a multicast of the index update to the plurality of query nodes.

3. The computer-implemented method of claim 1, further comprising:
    responsive to receiving the index update at a query node of the plurality of query nodes, updating the locally stored index structure of the query node with the index update.

4. The computer-implemented method of claim 1, wherein the forwarding the index update to the plurality of query nodes of the time series data monitoring system from the ingestion node is performed concurrent to the storing the index update to the index database of the time series data monitoring system.

5. The computer-implemented method of claim 1, wherein the storing the index update to an index database of the time series data monitoring system comprises:
    forwarding the index update to a message queue of the time series data monitoring system; and
    writing the index update to the index database from the message queue.

6. The computer-implemented method of claim 1, further comprising:
    refreshing the locally stored index structure of a query node according to a refresh schedule, wherein the refreshing the locally stored index structure of the query node overwrites the locally stored index structure of the query node with the index database.

7. A non-transitory computer readable storage medium having computer readable program code stored thereon for causing a computer system to perform a method for handling of an index update, the method comprising:
    receiving time series data at an ingestion node of a time series data monitoring system, wherein the ingestion node is configured to process the time series data for persistence and indexing;
    storing the time series data at a time series database of the time series data monitoring system;
    determining an index update based on the time series data at the ingestion node;
    storing the index update to an index database of the time series data monitoring system;
    forwarding the index update to a plurality of query nodes of the time series data monitoring system, wherein each query node of the plurality of query nodes maintains a locally stored index structure and is configured to receive and process queries for searching the time series data using the locally stored index structure;
    responsive to receiving the index update at the plurality of query nodes, updating the locally stored index structures of the plurality of query nodes with the index updatei
    receiving a query at a query node of the plurality of query nodes; and
    responsive to receiving a query at the query node, utilizing the locally stored index structure of the query node to identify a location of data point responsive to the query at the time series database.

8. The non-transitory computer readable storage medium of claim 7, wherein the forwarding the index update to a plurality of query nodes of the time series data monitoring system comprises:
performing a multicast of the index update to the plurality of query nodes.

9. The non-transitory computer readable storage medium of claim 7, wherein the forwarding the index update to the plurality of query nodes of the time series data monitoring system from the ingestion node is performed concurrent to the storing the index update to the index database of the time series data monitoring system.

10. The non-transitory computer readable storage medium of claim 7, wherein the storing the index update to an index database of the time series data monitoring system comprises:
forwarding the index update to a message queue of the time series data monitoring system; and
writing the index update to the index database from the message queue.

11. The non-transitory computer readable storage medium of claim 7, the method further comprising:
refreshing the locally stored index structures of the plurality of query nodes according to a refresh schedule, wherein the refreshing the locally stored index structures of the plurality of query nodes overwrites the locally stored index structures of the plurality of query nodes with the index database.

12. A time series data monitoring system for handling of index update of time series data, the time series data monitoring system comprising:
a plurality of nodes comprising a plurality of ingestion nodes and a plurality of query nodes, wherein the plurality of ingestion nodes is configured to process the time series data for persistence and indexing and wherein each query node of the plurality of query nodes maintains a locally stored index structure and is configured to receive and process queries for searching the time series data using the locally stored index structure, each node of the plurality of nodes comprising a data storage unit and a processor communicatively coupled with the data storage unit, an ingestion node of the plurality of ingestion nodes is configured to:
receive time series data;
store the time series data at a time series database of the time series data monitoring system;
determine an index update based on the time series data at the ingestion node;
control storage of the index update to an index database of the time series data monitoring system; and
forward the index update to the plurality of query nodes of the time series data monitoring system; and a query node of the plurality of query nodes is configured to:
receive a query; and
responsive to receiving the query at the query node, utilize the locally stored index structure of the query node to identify a location of data point responsive to the query at the time series database.

13. The time series data monitoring system of claim 12, wherein the ingestion node of the plurality of ingestion nodes is configured to forward the index update to the plurality of query nodes by performing a multicast of the index update to the plurality of query nodes.

14. The time series data monitoring system of claim 12, wherein the ingestion node of the plurality of ingestion nodes is configured to control the storage of the index update by forwarding the index update to a message queue of the time series data monitoring system, wherein the index update are written to the index database from the message queue.

15. The time series data monitoring system of claim 12, wherein a query node of the plurality of query nodes is configured to:
update the locally stored index structure of the query node with the index update in response to receiving the index update from at least one ingestion node of the plurality of ingestion nodes.

16. The time series data monitoring system of claim 12, wherein a query node of the plurality of query nodes is configured to:
refresh the locally stored index structure of the query node according to a refresh schedule, wherein the refresh of the locally stored index structure of the query node overwrites the locally stored index structure of the query node with the index database.

* * * * *